United States Patent [19]

Peterson et al.

[11] 4,377,979
[45] Mar. 29, 1983

[54] CONSERVATION TILLAGE ROW CROP PLANTER SYSTEM

[75] Inventors: Richard L. Peterson, Le Sueur; James A. Johnson, Cologne; Richard W. Steinberg, Mankato; Roger J. Scheurer, Kasota, all of Minn.

[73] Assignee: Hiniker Company, Mankato, Minn.

[21] Appl. No.: 249,397

[22] Filed: Mar. 31, 1981

[51] Int. Cl.³ ............................................. A01C 5/00
[52] U.S. Cl. ...................................... 111/52; 111/85; 172/151; 172/166; 172/430; 172/604; 172/611; 172/624.5; 172/657
[58] Field of Search ........................ 111/6, 52, 62-64, 111/66-69, 80, 73, 81, 85, 87, 88; 172/525, 611, 133, 140, 145-158, 184, 186, 187, 462, 484, 574, 430, 604, 166, 624.5, 657

[56] References Cited

U.S. PATENT DOCUMENTS

| Re. 25,803 | 6/1965 | Lynch | 172/393 |
|---|---|---|---|
| 2,164,220 | 6/1939 | Nash | 172/611 |
| 2,268,055 | 12/1941 | Neisingh | 172/599 |
| 2,563,185 | 8/1951 | Oehler et al. | 111/85 X |
| 2,864,181 | 12/1958 | Simmons | 37/98 |
| 3,100,462 | 8/1963 | Steele et al. | 111/77 |
| 3,327,786 | 6/1967 | Meyer | 111/6 X |
| 3,362,361 | 1/1968 | Morrison | 111/85 X |
| 3,601,202 | 8/1971 | Steffe | 172/462 |
| 3,701,327 | 10/1972 | Krumholtz | 111/81 |
| 3,797,418 | 3/1974 | Bridger | 111/85 X |
| 4,048,929 | 9/1977 | Zumbahlen | 111/85 |
| 4,070,974 | 1/1978 | Stacy | 111/85 |
| 4,141,302 | 2/1979 | Morrison et al. | 111/52 |
| 4,180,005 | 12/1979 | Zumbahlen | 111/52 |
| 4,187,961 | 2/1980 | Harden et al. | 172/146 |
| 4,191,262 | 3/1980 | Sylvester | 111/85 X |

FOREIGN PATENT DOCUMENTS 334465 1/1917 France ............................... 172/611

OTHER PUBLICATIONS

Orthman, H. "Flexible Farming From Orthman" (Newsletter by Orthman Mfg., Inc.) Spring 1980, Issue No. 6.
Anon. *Buffalo All-Flex Till Planter* (Sales Leaflet) Fleischer Mfg., Inc., Box 848, Columbus, Neb.
Anon. "Now Add V-Slice Precision Planting to Your IHC-Cyclo" (Sales Leaflet) Acra-Plant Sales, Inc., P.O. Box 1114, Garden City, Kansas.

*Primary Examiner*—James R. Feyrer
*Attorney, Agent, or Firm*—Emrich, Lee, Brown & Hill

[57] ABSTRACT

The planter includes a number of forward tillage units each followed by an aligned planting unit. Both units are independently mounted by four-bar linkages to the planter frame. Each tillage unit includes a leading banded coulter followed by a pair of rolling row cleaning discs which are, in turn, followed by a fluted coulter. The system may be used in any of the following planting modes: (1) no-till planting, in which the fluted coulter only is used to prepare a narrow band of soil for planting with no trash removal; (2) ridge planting or till-planting, in which the row cleaning discs clear a deeper wide band before the fluted coulter while leaving bands between the row crops untilled; (3) minimum tillage planting, in which the row cleaning discs may be used to clear a shallow band of surface trash before the fluted coulter; and (4) conventional planting, in which the tillage units are raised and not used. Simple field adjustment can quickly convert the system to any of these plow modes as field conditions require. In each of the first three modes, an adjustable weight may be used to set the weight on the tillage units.

21 Claims, 7 Drawing Figures

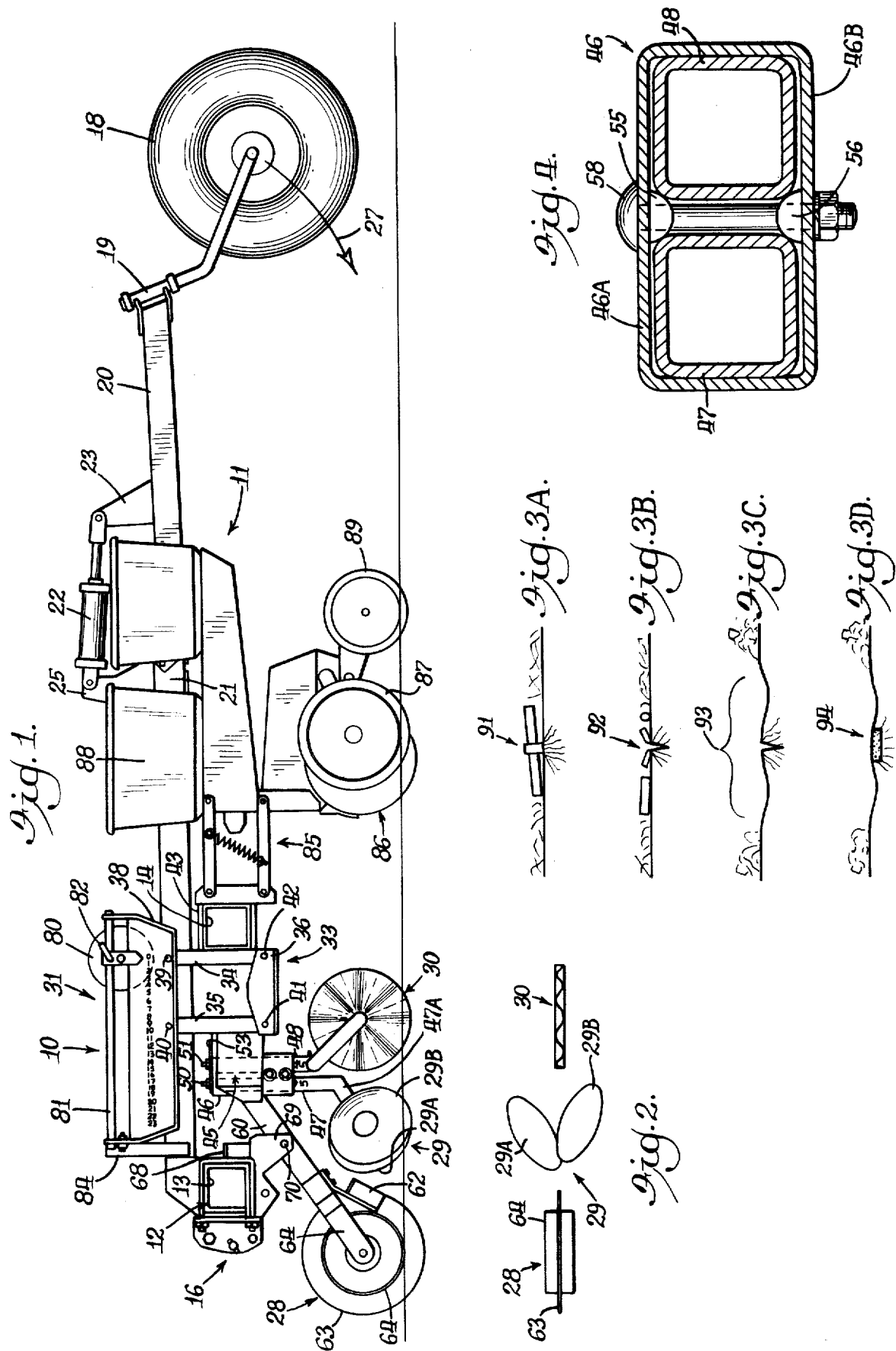

CONSERVATION TILLAGE ROW CROP PLANTER SYSTEM

BACKGROUND AND SUMMARY

The present invention relates to agricultural row crop planters; and more particularly, it relates to a row crop planter which includes conservation tillage apparatus on the planter.

For many years past, most farmers performed some deep tillage or plowing in the Fall after harvest or in the early Spring prior to planting, thinking this a necessary practice for maximum crop production. The plowing was accomplished by a moldboard plow, chisel plow or other implement, the purpose of which was to break up hard soil to a substantial depth, to bury trash such as stocks and other residue, and to bring up some of the deep soil. In the Spring, before planting, some farmers then performed secondary tillage and leveling operation, requiring a second pass over the field, to break up large clumps, pulvarize the soil and make it level. Following the seed bed preparation, a third pass of the land with the actual planter was normally required.

In recent times, farmers have become aware of the need to practice conservation techniques to preserve their most valuable asset, namely the rich soil in which the crops are grown. A principal way in which this is accomplished is to reduce the amount of primary or deep tillage prior to planting and to leave at least some of the trash at the surface of the soil. This prevents errosion by both wind and water run-off. Still further, with the advent of high fuel cost, the farmer has become increasingly aware of the economic advantages in reducing the number of passes over the land with the tractor. This has the added advantage of reducing the amount of time necessary to accomplish planting, permitting the farmer to plant more acreage and allowing him to take advantage of ideal planting conditions, both of which increase his income and make his operation more efficient.

Thus, in recent years, the farmer has become increasingly aware of the need to practice conservation tillage, and he has also educated himself to be aware of the trade-offs available between the practices of primary tillage, seed bed preparation and planting which reduce his expenses with little or no effect on the crop yield.

However, not all so-called conservation tillage systems presently available are effective in providing the farmer with a good crop yield while reducing the need for deep tillage or seed bed preparation. Further, those systems which have been found to be effective have not provided the farmer with the necessary versatility he needs to accomodate his planter system to various changes in soils or soil conditions, which vary from farm to farm or even field to field, and may change, if the farmer so desires for different crops.

Thus, a principal advantage and object of the present invention is the versatility and effectiveness that it provides in a conservation tillage row crop planter system, while permitting the entire system, including the tillage section, to operate at the higher speeds at which modern planting units are capable of operating. In the illustrated embodiment of the present invention, separate tillage and planting units are provided for each row, with the tillage unit mounted in a forward position to the planter frame by means of an independent four bar linkage which not only permits the depth of the planter unit to be independently set, but also isolates vertical excursions of the tillage unit, as in encountering heavy trash, rocks or lumps of hard soil, so that they do not affect the planting depth. The planting units then follow behind their associated tillage units.

A preferred form of the planter frame is a self-supporting pull-type frame having parallel forward and rear tool bars extending transverse of the direction of travel of the vehicle. The planter units, which may be conventional, are mounted behind the rear tool bar, each by its own four bar linkage. The tillage units are mounted between the forward and rear tool bars, each by its own independent four bar linkage which is connected to the rear tool bar so that the principal driving force for the tillage units is a pushing force rather than a pulling force, although this is not necessary to the practice of the invention. For lateral stability, the forward portions of the tillage units are mounted to the forward tool bar by a structure which prevents their lateral motion but which does not support any of the weight of the tillage units.

Each tillage unit includes a banded coulter followed by a pair of rolling row cleaning discs which are followed by a fluted coulter. The banded coulter sets the depth of the leading portion of the tillage unit and provides lateral stability to the unit, in combination with its mounting to the forward tool bar. Scrapers are provided for cleaning mud and trash from the banded coulter.

The row cleaning discs are arranged so that their leading edges overlap in a fore-to-aft direction to prevent accumulation of trash and debris. Further, the axes of rotation of the row cleaning discs are arranged so that the discs are inclined relative to the direction of travel and they face slightly downwardly to clear the trash to the side while avoiding clogging or plugging. The row cleaning discs are mounted to a common standard which is independently vertically adjustable on the subframe of the tillage unit. Although the operating depth of the row cleaning discs may be set continuously within a given range, it is contemplated that they will be set at one of three principal depths.

If the discs are set to a depth of approximately two inches (that is, the deepest portion of the trough formed by a disc lies nominally two inches below the surface of the soil), the discs will clear a path of approximately twelve to fourteen inches in width. This is referred to as the ridge planting or till-plant mode of operation. This mode of planting is advantageous in heavy soils or where it is desired to expose the soil above and lateral to the planted row to the sun's energy for quicker warming.

When the depth of the row cleaning discs is set to skim the surface of the soil so as to clear only surface residue, it is referred to as a minimum tillage mode of planting. This may be used where the farmer has previously used a chisel plow or disc harrow for Spring tillage. The higher setting of the row cleaning discs reduces fuel consumption while moving surface residue and larger clumps to the side for better gauging of planting depth.

The third principal mode for the row cleaning discs is to set them above the level of the ground so that they are not used. This setting is used for both the no-till mode of planting in which only the fluted coulter is used, as well as in the conventional planter mode in which the tillage unit is locked entirely in a raised position.

The row cleaning discs, as mentioned, are followed by a fluted or tillage coulter which works and loosens a narrow band of soil approximately two inches wide, depending upon the undulations of the coulter, and perhaps three inches deep—i.e., about the dimensions of a seed furrow. This facilitates furrow-opening by the planter which follows, and also loosens the soil in which the seed is to be planted to promote root development of the seedling and penetration of the soil by the developing plant.

Each tillage unit is provided with a weight adjusting mechanism for transferring weight from the rear tool bar to the tillage unit. The amount of weight transferred is continuously adjustable over a wide range to accomodate the tillage unit to variations in soil condition as well as to differences in operating speed of the system.

The present invention thus provides a planting system which is highly effective in accomplishing a desired amount of tillage at the same time row crops are planted, while adapting to a wide range of uses and preferences.

Other features and advantages of the present invention will be apparent to persons skilled in the art from the following detailed description of a preferred embodiment accompanied by the attached drawing.

THE DRAWING

FIG. 1 is the left side elevational view of apparatus constructed according to the present invention showing one tillage unit and its associated planting unit.

FIG. 2 is a diagrammatic plan view illustrating the three major ground-engaging elements of the tillage unit of the apparatus of FIG. 1;

FIGS. 3A-3D are diagramatic illustrations of soil profiles for illustrating the function of the various elements of the tillage unit; and FIG. 4 is a horizontal section through the subframe of the tillage unit.

DETAILED DESCRIPTION

Referring first to FIG. 1, the conservation tillage planter system of the present invention is seen to include a forward tillage unit generally designated 10 followed by an associated planter unit generally designated 11. Both the tillage unit 10 and the planter unit 11 are mounted to a common integral frame generally designated 12 and including a forward transverse tool bar 13 and a rear transverse tool bar 14 rigidly connected together by means of cross members which are not shown in FIG. 1 for clarity. Preferably, the tool bars 13, 14 are tubular steel beams, and their length depends upon the number of rows of crop for which the system is designed. Typically, for example, in the planting of soybeans and corn, the row spacing is 36 inches or 30 inches.

The frame 12, again depending upon the number of rows which it is designed to plant, may be provided with support wheels. Since the use of such support wheels is conventional, again, they are not shown in the illustration.

The forward end of the frame 12 is provided with a mounting bracket generally designated 16 for mounting the frame to the lower draw brackets of a conventional three-point hitch. Further, a pair of rear support wheels, one of which is designated 18 in FIG. 1, is provided to raise the entire tillage and planting system for road travel. The road travel wheels may be similar in structure so that only one need be described for complete understanding.

Briefly, the road travel or lift assist wheel is mounted by means of a spindle 19 to an articulated frame including frame members 20 and 21 which are pivotally connected. The forward frame member 21 is rigidly secured to both the front and rear tool bars 13, 14. A hydraulic cylinder 22 is pivotally connected at one end to a bracket 23 welded to the rear frame 20, and at its forward end to a bracket 25 welded to the forward frame member 21. When the hydraulic cylinder 22 is extended, the lift assist wheel 18 is lowered in the direction of the arrow 27 until it engages the ground, and thereafter, as the cylinder 22 is extended, the entire planter frame as well as the tillage units and planting units which it carries are raised for over-the-road travel. The transport wheels and their associated lift assemblies are located between adjacent planter units so as not to interfere with the operation of those units.

Turning now to the tillage unit 10, it includes the following elements: a forwarded banded coulter 28, a pair of row cleaning discs 29, a fluted or tillage coulter 30, and an adjustable weight transfer mechanism generally designated 31. In the illustrated embodiment, the tillage unit 10 is connected to the rear tool bar 14 by means of a four-bar linkage assembly, generally designated 33. By mounting the tillage units in this manner, they are pushed forward in operation, but they could also be mounted to the forward tool bar 13, and, hence, pulled in operation.

The four-bar linkage assembly 33 prefereably includes two four-bar linkages spaced laterally of each other and having associated vertical links rigidly secured together. This provides lateral stability to the tillage unit in use. The left side linkage is seen in FIG. 1 to include a rear vertical link 34, a forward vertical link 35, a lower horizontal link 36 in the form of an angle member, and an upper horizontal link formed by the frame 38 of the weight transfer mechanism 31. As mentioned, a second, similar, four-bar linkage operating with the same four pivot points (designated respectively 39-42) is provided on the right side of the tillage unit 10. Thus, a link similar to link 34 is provided on the right side of the tillage unit, and these two links are connected together by a flat vertical plate which is used to secure the unit to the rear tool bar 14 by conventional bolts, one of which is seen at 43.

A second forward vertical link similar to the one shown at 35 is connected to the link 35 by means of a vertical plate; and a tillage unit subframe generally designated 45 is welded to that plate so that the subframe 45 is permitted to move vertically with the forward link 35 relative to the tool bar 14.

A vertical tubular housing 46 is welded to the subframe 45 for receiving a first vertical standard 47 which carries the row cleaning discs 29, and a second vertical standard 48 which carries the fluted coulter 30. The standards 47, 48, and thus the row clearing discs and fluted coulter are independently adjustable within the housing 46. To accomplish these adjustments, the standards 47, 48 are received vertically in the housing 46 which has a width just sufficient to receive the standard and a length slightly greater than their combined depths. The standards 47, 48 are each provided with an upper threaded bolt designated 50 and 51, respectively, which extend through a top plate 53 of the housing 46 and are held in adjusted position by means of the internally threaded nuts bearing against the upper surface of the plate 53. Further, as indicated in FIG. 4, the standards 47, 48 are spaced by a pair of wedge members 55, 56 which extend vertically within the housing and are assembled to the interior of the side walls 46A, 46B, of the housing 46. A pair of bolts (seen in FIG. 1), one of which is designated 58 in FIG. 4, when tightened, draw the side walls 46A, 46B together, thereby forcing the wedge members 55, 56 between the standards 47, 48. The standards are thus clamped tightly within the housing 46 in their adjusted position.

The tillage unit subframe 46 also includes a forwardly and downwardly inclined frame member 60 which carries, at its lower end, a yoke 61 in which the banded coulter 28 is journaled. A scraper 62 is mounted beneath the yoke 61 for clearing soil both from the upright blade 63 of the banded coulter as well as the circumferential band 64.

The frame 60 also includes an upstanding post 68, the purpose of which will be described presently. The frame member 60 is received in a pair of laterally-spaced vertical plates, one of which is seen at 69 in FIG. 1. These plates are connected to the forward tool bar 13, and they are spaced at a distance only slightly greater than the width of the frame member 60 so as to stabilize it against lateral deflection while permitting it to move freely vertically. Further, the lower portions of these plates are apertured at 70 to receive a lock pin. If the subframe 46 is raised and the lock pin is placed in the apertures 70, the entire tillage unit is locked in a raised position out of use, thereby permitting the planting units 11 to be used alone. Thus, the system may be used as a conventional planter without any tillage whatever. Normally, (i.e.—when the tillage units are being used), the lock pin is stored in similar apertures beneath the forward tool bar 13.

Turning now to the weight transfer mechanism 31, it includes a cylindrical weight 80 which rides on a pair of side rails, one of which is shown at 81, between the rear position shown and a forward position at the forward end of the frame 38. A latch or locking member 82 is used to lock the weight in an adjusted position. The forward end of the frame 38 may be provided with an additional weight, if desired, such as that designated 84. As the weight 80 is moved forwardly of a vertical plane passing through the pivot points 39, 42, its weight is transferred to the forward vertical link 35 of the four-bar linkage 33, and thus to the subframe 45 of the tillage unit. As the weight 80 is moved still forwardly and past the vertical plane including the forward pivot members 40, 41 of the four-bar linkage 33, leverage is increased and weight is transferred to the subframe 46 in an increased amount so that at some position, depending upon the dimensions involved, an increased leverage effect takes place resulting in an applied weight to the subframe 46 greater than the actual weight of the frame 80. One way to think of this is that the downward force on the forward link 35 is a direct function of the length of a moment arm defined by the distance between a vertical plane passing through the pivot point 40 and a vertical plane passing through the axis (or center of gravity) of the weight 80. This mechanism, in effect, transfers weight from the rear tool bar 14 through the four-bar linkage 33 to the subframe 46. It will be appreciated that with the lift wheels 18 in the raised position and extending far rearwardly of the tool bar 14, that rear tool bar in fact bears substantial weight. This is considered an important feature of the invention because it permits the tillage unit to accomodate the different tractor speeds as well as to different soil conditions such as hardness, heavy residue or the like.

Turning now to the row cleaning discs 29, there are two such discs designated respectively 29A and 29B. The discs are mounted to a lower forwardly projecting portion 47A of the standard 47. The discs 29A, 29B may be conventional dish-shaped discs, but their axes of rotation extend downwardly and forwardly so that in action they clear surface residue and some topsoil, depending upon the depth to which they are set, in a lateral direction. By way of example, the axis of each disc may be set to form an angle of approximately 56° relative to a vertical plane parallel to the furrow being formed (i.e., the axes of the discs are turned outwardly that amount relative to the direction of travel of the vehicle). Further, the axis of each disc is turned downwardly to form an angle of approximately 40° relative to a horizontal plane.

In the illustrated pair, the disc 29A has its leading edge overlapping the leading edge of the associated disc 29B (see FIG. 2) by a slight amount so as to prevent plugging by trash. The pair of trash-clearing discs of the illustrated embodiment are referred to as a right-hand trash cleaning disc assembly since the leading disc is on the right side (when viewed from the rear). This arrangement produces a net lateral draft force to the left side; and it is, therefore, desirable to have a left-hand assembly for each such right-hand assembly to balance lateral draft forces in the implement.

The use of overlapping disc pairs of this nature and in this configuration have been found to be highly effective in clearing trash, residue, and clumps of soil to the side without the plugging sometimes experienced by sweeps or shovels when used to perform a clearing function.

The fluted coulter 30 may be of convention construction, such that the maximum lateral distance between adjacent undulations (refer to FIG. 2) may be of the order of approximately two inches.

As indicated above, the planter unit 11 may be a commercially available unit. In the illustrated embodiment, for clarity of understanding, the unit 11 is mounted behind and to the rear tool bar 14 by means of a separate four-bar linkage generally designated 85. A furrow is formed by a pair of opener discs 86, the depth of the furrow being defined by gauge wheels, one of which is designated 87. The seed is deposited in the furrow between the gauge wheels 87, metered by a conventional metering unit from a seed storage hopper 88. The furrow is closed by a pair of trailing pinch wheels, one of which is shown at 89.

OPERATION

When the apparatus is used in the till-plant mode, the banded coulter 28, row-cleaning discs 29 and fluted coulter 30 are all used. The banded coulter 28 performs a number of functions. Leading the tillage unit, as it does, it first slices any residue or debris, similar to a conventional coulter. It also limits the operating depth of the other components of the tillage unit 10 by setting the depth of the subframe 46 by virtue of the circumferential band 64. The banded coulter also provides lateral stability to the tillage unit. In the till-plant mode, planting is accomplished on the ridge of the previous crop. Referring to FIG. 3A, such a ridge is generally designated by reference numeral 91, and it may include stumps of stocks standing upright as well as portions of stocks or other debris extending across the ridge. Such latter debris has a tendency to bridge across and accumulate on most types of implements. The stubs and roots of previous crops, on the other hand, are quite tough and make tillage difficult, particularly where the debris has not fully decayed. In this case, the banded coulter 28 stabilizes the tillage unit 10 as well as the planting unit 11 on the previous ridge and the blade 63 slices all residue and debris along a vertical plane as generally indicated at 92 in FIG. 3B.

Following the banded coulter, the clearing discs 29 then clear the parted debris to form a cleared strip generally indicated within the bracket 93 in FIG. 3C. In this till-plant mode, the depth of the clearing disc 29 is set to form furrows having a depth of approximately two inches to the side of the vertical clearing plane formed by the blade 63 of the banded coulter. Thus, the row clearing discs, in this mode particularly, not only clear the previous ridge of the parted trash and residue, but they actually perform a tillage function by removing at least some of the surface soil. This further exposes the ridge, normally already high, and the immediately adjacent soil to the rays of the sun to further promote and accelerate warm up during Spring.

Following the clearing discs, the fluted coulter 30 tills a narrow strip of land diagramatically illustrated at 94 in FIG. 3D by loosening the soil in that strip to a depth of approximately three inches, the strip having a width of approximately two inches. This soil is simply loosened, not necessarily displaced or turned. This action facilitates tracking by the furrow-opening discs 86 of the planter 11 (or by the runner opener of comparable planters).

The lateral stability of the tillage unit 10 is also enhanced by the stabilizer plates 69 which act to limit the lateral deflection of the frame member 60 relative to the forward tool bar 63. Further, the post 68 is provided with an upper cross plate to engage the top of the stabilizer plates 69 to limit the downward movement of the tillage unit relative to the planter frame.

In the till-plant mode thus described, it will be appreciated that except for the cleared strip 93 (which may have a nominal width in the range of 12-14 inches, for example), the rest of the trash and surface residue is accumulated under the adjacent soil, thus promoting conservation, protecting the soil against erosion, and maintaining the moisture in the soil.

If conditions permit, and the farmer desires to reduce planting time and conserve fuel by reducing secondary tillage, while using a chisel or disc harrow for prior tillage, the clearing discs 29 may be raised so that they just skim the surface of the soil to clear trash and any large clumps or the like without performing substantial tillage. The rest of the elements of the tillage unit function as described above. In this mode sometimes referred to as minimum tillage mode, the tractor speed may vary over a wide range without detrimental effect.

Alternatively, the row clearing discs 29 may be elevated even higher to a position where they do not engage the ground or any surface residue whatever, and this is referred to as a no-till planting mode. The fluted coulter 30 is used in this mode, and it is still close-coupled to the furrow-opener discs of the planter unit so that the planter unit tracks in the slot prepared by the fluted coulter.

Still further, in some fields or under some conditions where conventional secondary tillage and seed bed preparation is used (or, for example, where one farmer rents land and the owner demands such conventional practices), the tillage units may be raised and locked in a raised position by inserting the pin 70 beneath the frame portion 60; and the trailing planter units may nevertheless be used in a conventional planter mode.

Having thus described in detail a preferred embodiment of the invention, persons skilled in the art will be able to modify certain of the structure which has been illustrated and to substitute equivalent elements for those disclosed while continuing the practice the principle of the invention; and it is, therefore, intended that all such modification and substitution be covered and they are embraced within the spirit and scope of the appended claims.

We claim:

1. Conservation tillage and row crop planting apparatus adapted to be pulled by a traction vehicle comprising: a frame; a plurality of tillage units, one for each row of crop to be planted; linkage means for each tillage unit for mounting said tillage units to said frame in laterally spaced relation and permitting each tillage unit to move vertically independent of the others, each tillage unit including a forward rolling coulter for cutting a slit in the soil, a pair of cooperating clearing discs located behind said coulter and each having its leading edge generally aligned with and entering the slit formed by the forward coulter associated with said pair for clearing residue and tilling soil to both sides of said slit, and rotating tillage coulter means for loosening soil in a band located approximately in the center of the cleared strip formed by said clearing discs; a planter unit associated with each of said tillage units and mounted behind its associated tillage unit to said frame for independent vertical movement relative to said frame, each planter unit including furrow-opener means tracking in the band of loosened soil formed by said tillage coulter means of the associated tillage unit.

2. The apparatus of claim 1 further comprising lift wheel means connected to said apparatus frame for raising said apparatus frame to an elevation such that said tillage units and said planter units do not engage the ground for road travel; and power means for moving said lift wheel means between a lowered road travel position and an elevated position in which said tillage units and said planter units are placed in operative position with the ground.

3. The apparatus of claim 1 wherein each of said tillage units further comprises means for adjustably transferring the weight of said frame to its associated tillage unit to set a predetermined penetration force for said rolling coulter, said clearing discs and said tillage coulter means.

4. The apparatus of claim 3 wherein each of said tillage units further comprises: a tillage unit subframe; four-bar linkage means for mounting said tillage unit subframe to said frame of said apparatus, said weight adjusting means cooperating with said four-bar linkage mounting means for adjusting the penetration force of said tillage unit by transferring the weight of said apparatus frame thereto in a controlled manner.

5. The apparatus of claim 1 wherein each of said tillage units comprises a subframe; four-bar linkage mounting means for mounting said subframe to said frame of said apparatus for vertical movement relative to said apparatus frame independent of adjacent tillage units and independent of its associated planter unit.

6. The apparatus of claim 5 further comprising means for mounting said pair of clearing discs to said tillage unit subframe in an adjusted vertical position; and means for securing said clearing discs to said subframe in said adjusted vertical position.

7. The apparatus of claim 5 further comprising means for mounting said tillage coulter means to said tillage unit subframe for vertical adjustment; and means for securing said tillage coulter means to said tillage unit subframe in the adjusted vertical position.

8. The apparatus of claim 5 wherein said rolling coulter comprises a banded coulter having a generally planar disc rotating about an axis transverse of the direction of travel of said tillage unit for forming said slit, and a circumferential band spaced inwardly of the outer circumference of said planar disc to limit the penetration of said disc.

9. The apparatus of claim 8 wherein said apparatus frame includes a horizontal tool bar frame; each planter unit is mounted by a four-bar linkage to be pulled by said tool bar frame; each tillage unit is mounted by a four-bar linkage to be pushed by said tool bar frame; said subframe includes a downwardly and forwardly extending frame member for mounting said banded coulter; and said apparatus frame further comprises stabilizer means for stabilizing said downwardly and forwardly extending member of said tillage unit subframe against lateral deflection while permitting vertical motion thereof.

10. The apparatus of claim 5 wherein said clearing discs comprise first and second dish-shaped discs having their concave surfaces extending downwardly, outwardly and forwardly of the direction of travel of said apparatus for clearing surface debris, residue and a shallow furrow of topsoil behind said leading rolling coulter, one of said dish-shaped discs having its leading edge overlapping the leading edge of the other of said dish-shaped discs.

11. The apparatus of claim 10 wherein said subframe includes a first standard and said clearing discs are mounted for independent rotation and carried by said first standard, said tillage unit further comprising means for mounting said first standard to said subframe of said tillage unit in an adjusted vertical position and for locking said first standard to said subframe in the adjusted vertical position.

12. The apparatus of claim 5 wherein said tillage coulter means comprises a fluted coulter for loosening soil in a band in which the seed furrow is to be formed.

13. The apparatus of claim 12 further comprising a second standard for mounting said fluted coulter; and means for adjustably mounting said second standard to said subframe of said tillage unit in an adjusted vertical position and for locking said second standard to said subframe in said adjusted vertical position.

14. The apparatus of claim 5 wherein said apparatus frame includes a forward tool bar extending transverse of the direction of travel of said apparatus and a rear tool bar spaced behind said forward tool bar and extending transverse of the direction of travel of said apparatus, said planter units being mounted to said rear tool bar, and said mounting means for said tillage units comprising a four-bar linkage coupling said tillage units to one of said forward and rear tool bars and further including stabilizer means for each tillage unit mounted to the other of said forward and rear tool bars for stabilizing said planter units against lateral deflection.

15. The apparatus of claim 5 further comprising adjustable weight means including a frame comprising the upper horizontal link of said four-bar linkage mounting said tillage unit subframe to said apparatus main frame; a weight movable longitudinally of said weight-adjusting frame in parallel relation with said upper link of said four-bar linkage to a position remote from the connection of said four-bar linkage to said apparatus main frame, whereby when said weight is moved to said remote position, some of the weight of said main frame is transferred to said tillage unit in a controlled manner.

16. The apparatus of claim 15 futher comprising means for locking said weight in its adjusted position.

17. Conservation tillage and planting apparatus adapted to be pulled by a traction vehicle comprising: a frame; a plurality of tillage units laterally spaced and mounted to said frame for independent vertical movement, each tillage unit including a rolling coulter for forming a leading slit in the soil, a pair of cooperating clearing discs mounted behind said coulter for clearing residue and tilling soil to both sides of said slit, rotating tillage coulter means for loosening soil in a band located approximately in the center of the cleared strip formed by said clearing discs; four-bar linkage means for mounting each tillage unit to said frame of said apparatus, and weight adjusting means cooperating with said four-bar linkage mounting means for adjusting the penetration force of said tillage unit; a planter unit associated with each of said tillage units and mounted behind its associated tillage unit to said frame for independent vertical movement relative to said frame, each planter unit including furrow-opener means tracking in the band of loosened soil formed by said tillage coulter means of the associated tillage unit.

18. The apparatus of claim 17 wherein said rolling coulter comprises a banded coulter having a generally planar disc rotating about an axis transverse of the direction of travel of said tillage unit for forming said slit, and a circumferential band spaced inwardly of the outer circumference of said planar disc to limit the penetration of said disc.

19. The apparatus of claim 17 wherein said clearing discs comprise first and second dish-shaped discs having their concave surfaces extending downwardly, outwardly and forwardly of the direction of travel of said apparatus for clearing surface debris, residue and a shallow furrow of topsoil behind said leading rolling coulter, one of said dish-shaped discs having its leading edge overlapping the leading edge of the other of said dish-shaped discs.

20. The apparatus of claim 17 wherein each of said tillage units comprises a subframe; said four-bar linkage means mounting said subframe to said frame of said apparatus for vertical movement relative to said apparatus frame independent of adjacent tillage units and independent of its associated planter unit; and further comprising means for mounting said pair of clearing discs to its associated tillage unit subframe in an adjusted vertical position; and means for securing each clearing disc pair to its associated subframe in said adjusted vertical position.

21. The apparatus of claim 20 further comprising means for mounting said tillage coulter means to said tillage unit subframe for vertical adjustment; and means for securing said tillage coulter means to said tillage unit subframe in the adjusted vertical position.

* * * * *